(12) United States Patent
Tiwari et al.

(10) Patent No.: US 11,570,738 B1
(45) Date of Patent: Jan. 31, 2023

(54) E-SIM TRIAL

(71) Applicant: T-Mobile Innovations LLC, Overland Park, KS (US)

(72) Inventors: Hemant Tiwari, Overland Park, KS (US); Sadanand Pawar, Overland Park, KS (US); Jason B. Marshall, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/374,398

(22) Filed: Jul. 13, 2021

Related U.S. Application Data (60) Provisional application No. 63/213,515, filed on Jun. 22, 2021.

(51) Int. Cl.
| | |
|---|---|
| *H04W 48/18* | (2009.01) |
| *H04W 60/00* | (2009.01) |
| *H04W 8/18* | (2009.01) |
| *H04W 24/10* | (2009.01) |
| *H04W 88/06* | (2009.01) |

(52) U.S. Cl.
CPC ......... *H04W 60/005* (2013.01); *H04W 8/183* (2013.01); *H04W 24/10* (2013.01); *H04W 48/18* (2013.01); *H04W 88/06* (2013.01)

(58) Field of Classification Search
CPC ... H04W 60/005; H04W 8/183; H04W 24/10; H04W 48/18; H04W 88/06
See application file for complete search history.

(56) References Cited

U.S. PATENT DOCUMENTS

| | | | |
|---|---|---|---|
| 11,343,687 B1* | 5/2022 | Ruelke | H04W 4/06 |
| 2019/0253935 A1* | 8/2019 | Huang-Fu | H04W 36/14 |
| 2020/0068647 A1* | 2/2020 | Jha | H04W 60/005 |
| 2020/0267618 A1* | 8/2020 | Kye | H04W 76/15 |
| 2022/0053426 A1* | 2/2022 | Ahn | H04W 76/16 |
| 2022/0110015 A1* | 4/2022 | Krishnamurthy | H04W 72/08 |

\* cited by examiner

*Primary Examiner* — Julio R Perez
(74) *Attorney, Agent, or Firm* — Shook, Hardy & Bacon L.L.P.

(57) ABSTRACT

Systems and methods for providing at least one electronic indication of network benefit of a telecommunication network include a first telecom network and a user device. The user device includes sim circuitry. The user device is structured to connect to the first telecom network and a secondary telecom network, receive at least one first device signal associated with the first telecom network and at least one secondary device signal associated with the secondary telecom network, determine one or more signal factors based on the at least one first device signal and the at least one secondary device signal, generate one or more network scores in response to the one or more signal factors determined, and based on the one or more network scores, provide at least one electronic indication of network benefit of the first telecom network and the secondary telecom network.

20 Claims, 5 Drawing Sheets

E-SIM TRIAL

CROSS-REFERENCE TO RELATED APPLICATIONS

This application claims the benefit of U.S. Provisional Application No. 63/213,515, filed Jun. 22, 2021, entitled "METHOD AND SYSTEMS FOR E-SIM TRIAL," the content of which is incorporated by reference herein in its entirety.

SUMMARY

The present disclosure is directed, in part, to providing at least one electronic indication of network benefit of a telecommunication network, substantially as shown in and/or described in connection with at least one of the figures, and as set forth more completely in the claims.

In aspects set forth herein, a user device is connected to a telecommunication network. Typically, the user device is connected to the telecommunication network that is operated by a specified provider. The quality of the telecommunication network is discovered after the user device is subscribed to the telecommunication network of the specified provider. However, here, a user device is connected to a secondary telecom network (e.g., a telecom network of interest to an end user) and provided at least one electronic indication of network benefit of the secondary telecommunication network which provides an indication of the strength, quality, etc. of the secondary telecom network in addition to or alternative to the telecommunication network of the specified provider.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for providing at least one electronic indication of network benefit of a telecommunication network (e.g., a telecom network). A user device is connected to a first telecom network and a secondary telecom network. A network type of the secondary telecom network is determined. At least one first device signal associated with the first telecom network and at least one secondary device signal associated with the secondary telecom network is received. One or more signal factors are determined based on the at least one first device signal and the at least one secondary device signal. One or more network scores are generated in response to the one or more signal factors determined. At least one electronic indication of network benefit of the first telecom network associated with the first carrier and the secondary telecom network associated with the secondary carrier is provided based on the one or more network scores, which provides an indication of the strength, quality, etc. of the secondary telecom network.

Advantageously, providing methods and systems for the provision of at least one electronic indication of network benefit of a telecommunication network connects the user device to a secondary telecom network of interest to an end user and provides an indication of the strength, quality, etc. of the secondary telecom network in addition to or alternative to the telecom network the user device previously subscribed to.

In one aspect, a method is provided for providing at least one electronic indication of network benefit of a telecommunication network. The method includes connecting to a first telecom network associated with a first carrier and a secondary telecom network associated with a secondary carrier. The method also includes determining a network type of the secondary telecom network. The method further includes receiving at least one first device signal associated with the first telecom network and at least one secondary device signal associated with the secondary telecom network. The method further includes determining one or more signal factors based on the at least one first device signal and the at least one secondary device signal. The method further includes generating one or more network scores in response to the one or more signal factors determined. The method further includes, based on the one or more network scores, providing at least one electronic indication of network benefit of the first telecom network associated with the first carrier and the secondary telecom network associated with the secondary carrier.

In another aspect, a computer-readable storage media having computer-executable instructions embodied thereon is provided that, when executed by one or more processors, cause the processors to perform various steps. The processors are caused to monitor a first telecom network associated with a first carrier and a secondary telecom network associated with a secondary carrier. The processors are also caused to receive at least one first device signal associated with the first telecom network and at least one secondary device signal associated with the secondary telecom network, the at least one first device signal and the at least one secondary device signal associated with one or more geographic areas. The processors are further caused to determine one or more signal factors based on the at least one first device signal and the at least one secondary device signal associated with the one or more geographic areas. The processors are further caused to generate one or more network scores in response to the one or more signal factors determined. The processors are further caused to, based on the one or more network scores, provide in real-time at least one electronic indication of network benefit of the first telecom network associated with the first carrier and the secondary telecom network associated with the secondary carrier.

In yet another aspect, a system is provided for providing at least one electronic indication of network benefit of a telecommunication network. The system includes a first telecom network associated with a first carrier and a user device comprising sim circuitry. The user device connects to the first telecom network and a secondary telecom network. The user device also determines a network type of the secondary telecom network. The user device further receives at least one first device signal associated with the first telecom network and at least one secondary device signal associated with the secondary telecom network. The user device further determines one or more signal factors based on the at least one first device signal and the at least one secondary device signal. The user device further generates one or more network scores in response to the one or more signal factors determined. The user device further provides, based on the one or more network scores, at least one electronic indication of network benefit of the first telecom network associated with the first carrier and the secondary telecom network associated with the secondary carrier.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
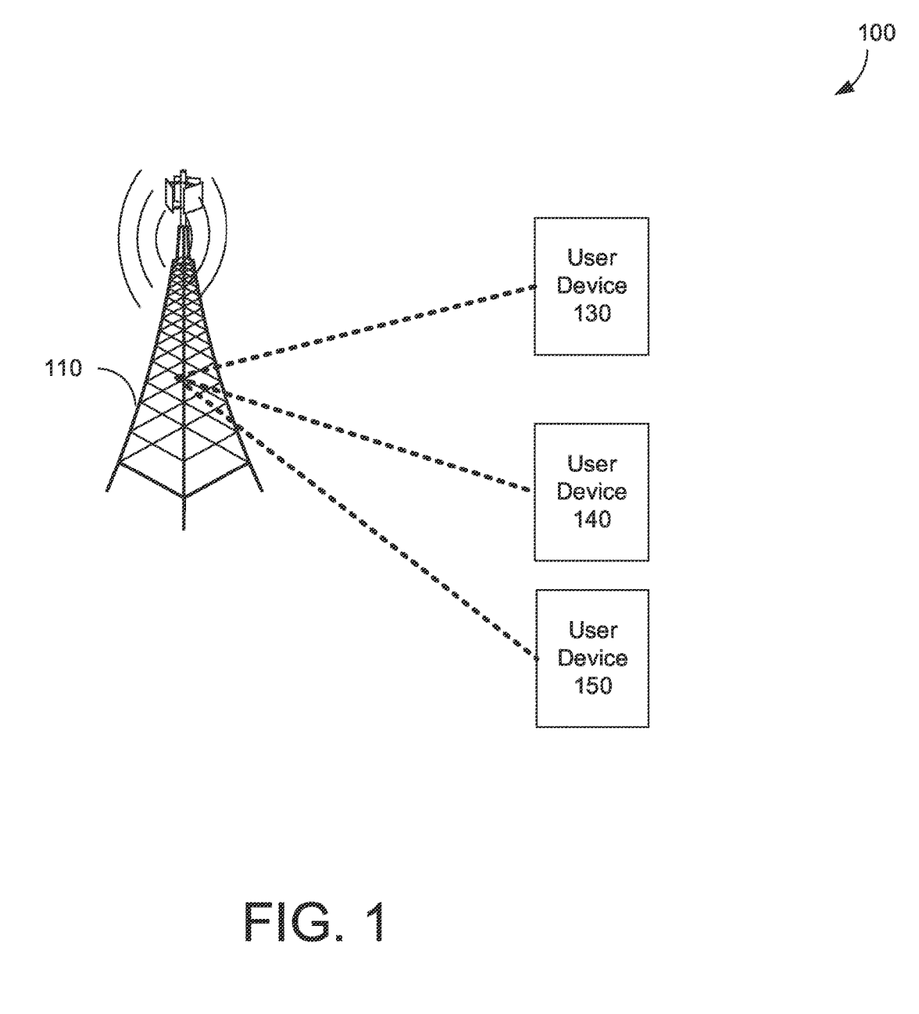
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may include a telecom network 110 (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecom network 110 included in the network environment 100 may include or otherwise may be accessible through a cell site. The cell site may include one or more antennas, base transmitter stations, radios, transmitter/receivers, digital signal processors, control electronics, GPS equipment, power cabinets or power supply, base stations, charging stations, etc. such that the cell site may provide a communication link between the one or more user devices (e.g., the user devices 130, 140, and 150) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone mode. In the non-stand alone (NSA) mode the network environment 100 may take the form of, for example, an E-UTRAN New Radio-Dual Connectivity (EN-DC) network. In an EN-DC network, a user device (e.g., the user device 130, 140, and/or 150) may connect to or otherwise access a 4G, LTE, 5G, or any other suitable network simultaneously. In the stand alone mode, the telecom network 110 may take the form of a 5G network or any other suitable network.

In some embodiments, the user device (e.g., the user device 130, 140, and/or 150) may take the form of a wireless or mobile device capable of communication via the network environment 100. For example, the user device 130 may take the form of a mobile device capable of communication via a telecom network (e.g., the telecom network 110) such as, but not limited to, a wireless telecommunication network. In this regard, the user device may be any mobile computing device that communicates by way of a network, for example, a 3G, CDMA, 4G, LTE, WiMAX, 5G or any other type of network.

In some embodiments, the network environment 100 may be structured to connect subscribers (e.g., current subscribers and/or potential subscribers) to a service provider or a plurality of service providers. Alternatively or additionally, the network environment 100 may be associated with a specific telecommunication provider (e.g., a specific carrier) or a plurality of telecommunications providers (e.g., a plurality of carriers) that provide services (e.g. LTE, voice, location, data, etc.) to one or more user devices. For example, the user devices 130, 140, and 150 may be subscribers to a telecommunication service provider, in which the user devices are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
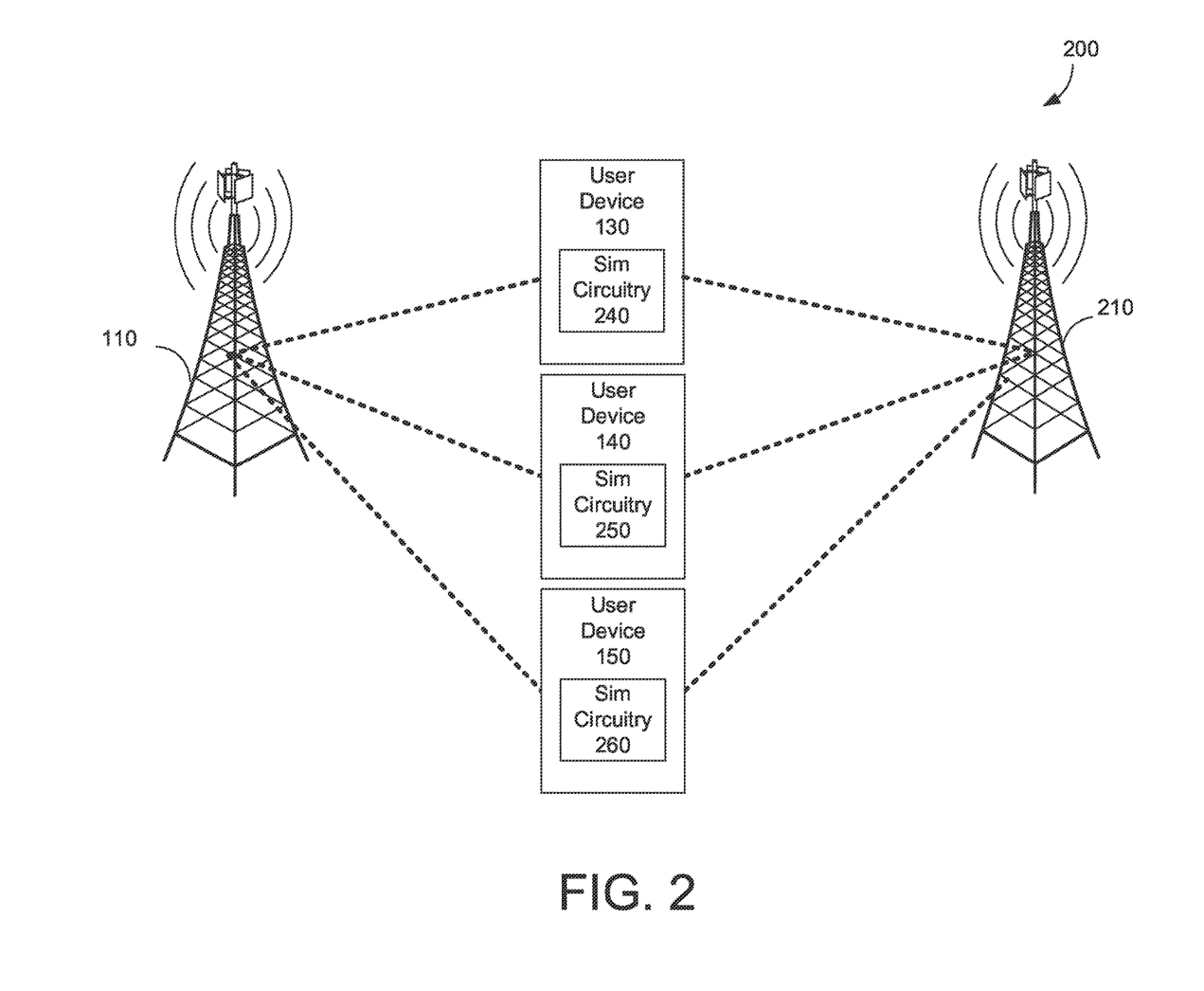
FIG. 2 is a diagram of a network environment including a plurality of telecom networks in accordance with an example embodiment.

FIG. 2 is a diagram of the network environment 200 (e.g., a telecommunication environment such as, but not limited to, a wireless telecommunication environment) according to an example embodiment. In the present embodiment, the network environment 200 includes the telecom network 110 and 210, sim circuitry 240, 250, and 260, and one or more user devices 130, 140, and 150. Although some of the components in the network environment 200 are depicted as multiple components (e.g., multiple user devices), in some embodiments, the network environment 200 may include one of such components.

In some embodiments, the user device (e.g., user device 130) may connect to or otherwise register to a first telecom network (e.g., the telecom network 110) associated with a first carrier or a secondary telecom network (e.g., the telecom network 210) associated with a secondary carrier. In some examples, the user device may connect to or otherwise register to the first telecom network associated with the first carrier and the secondary telecom network associated with the secondary carrier. In some embodiments, the sim circuitry (e.g., sim circuitry 240, 250, and/or 260) may be included within the user device, external to the user device, or otherwise communicatively coupled to the user device. For example, the user device 130 may include the sim circuitry 240 as illustrated. As used herein, the term "sim circuitry" may be used to refer to subscriber identity circuitry. The sim circuitry may include eSim circuitry (e.g., electronic subscriber identity circuitry, embedded subscriber identity circuitry, embedded universal integrated circuit card (eUICC), or any other suitable subscriber identity circuitry), a SIM card, and/or any other suitable subscriber identity circuitry. In some embodiments, he sim circuitry may include an international mobile subscriber identity (IMSI) number, serial SIM number (SSN), international article number (IAN), European article number (EAN), one or more authentication passwords (e.g., a personal identification number (PIN), personal unblocking key (PUK), etc.), and any other suitable component. Advantageously, the sim circuitry (e.g., the eSim circuitry) connects the user device to a secondary telecom network (e.g., a telecom network of interest to an end user such as the secondary telecom network 210) in addition to or alternative to another telecom network (e.g., a primary telecom network the user device accesses or otherwise connects to that is used by the end user such as the first telecom network 110). As a result, the sim circuitry may receive and provide data/information about the strength and quality of the connected telecom network as well as make various determinations about the telecom network among other functions.

The first telecom network and/or the secondary telecom network may include one or more cell sites, one or more nodes, or a combination thereof. In some embodiments, a telecom network may be associated with one or more nodes. Alternatively or additionally, one or more nodes may be associated with a plurality of cell sites. For example, the first telecom network 210 may include one or more nodes such as an Evolved Node B (e.g., eNodeB or eNB), a Next Generation Node B (e.g., gNodeB or gNB), a combination thereof, or any other suitable node structured to communicatively couple to the user device(s). The one or more nodes may be communicatively coupled to the user device(s) such that the node(s) may transmit to and receive requests and/or data from one or more user devices. In some examples, the first telecom network and/or the secondary telecom network may be operable in a non-stand alone mode or stand alone mode. The one or more nodes may allocate radio frequency, or a portion thereof, to user device(s). In further embodiments, the one or more nodes may be structured to manage the operation of one or more antennas (e.g., Multiple-Input Multiple-Output (MIMO) operations). Alternatively or additionally, the one or more nodes may manage the signaling (e.g., Orthogonal Frequency-Division Multiplexing (OFDM) signaling) within the network environment 200. The node(s) may manage a Radio Access Network (RAN) or any other suitable network.

In some examples, the sim circuitry (e.g., the eSim circuitry such as the sim circuitry 240, 250, and/or 260) may determine a network type of the first telecom network, the secondary telecom network, or any other suitable network. For example, the eSim circuitry may determine the network type of the secondary telecom network 210 is a 4G, LTE, 5G, or any other suitable network.

In some embodiments, the sim circuitry may receive at least one first device signal associated with the first telecom network 110. Alternatively or additionally, the sim circuitry may receive at least one secondary device signal associated with the secondary telecom network 210. The term "device signal" may be used to refer to or otherwise include a radio signal and/or information associated with a radio signal. The sim circuitry may receive a single device signal or multiple device signals from the network circuitry (e.g., the operating system network circuitry such as the network circuitry 310 illustrated in FIG. 3) corresponding to the user device(s).

With reference back to FIG. 2, responsive to receiving a single device signal or multiple device signals, the sim circuitry (e.g., the eSim circuitry) may determine one or more signal factors based on the first device signal, the secondary device signal, and/or any other suitable device signals. As used herein the term "signal factor" may be used to refer to measurements and/or parameters that may be indicative of signal strength reporting criteria, signal strength threshold(s), signal level function(s), signal measurement type(s), and/or any other suitable measurement that may be derived from a signal (e.g., a radio signal). For example, the sim circuitry (e.g., sim circuitry 240, 250, and/or 260) may measure the cell quality and signal strength responsive to receiving at least one first device signal associated with the first telecom network 110 and/or at least one secondary device signal associated with the secondary telecom network 210. In further examples, the sim circuitry may determine one or more signal factors based on at least one first device signal and the at least one secondary device signal associated with the one or more geographic areas as described herein with reference to FIG. 3.

In some embodiments, the sim circuitry may determine or otherwise customize the signal factor(s) (e.g., the signal measurement type(s)) for the first telecom network (e.g., a NG-RAN, 5G LTE network, etc.) and/or the secondary telecom network (e.g., an E-UTRAN, 4G LTE network, etc.). In this regard, the sim circuitry may determine one or more signal factors such as, but not limited to, the Signal Reference Signal Received Power (SSRSRP), Secondary Synchronization Signal Reference Signal Received Quality (SSRSRQ), Signal-To-Noise and Interference Ratio (SSINR), Reference Signal Received Power (RSRP), Reference Signal Received Quality (RSRQ), Received Strength Signal Indicator (RSSI), Reference Signal Signal to Noise Ratio (RSSNR), and/or any other suitable signal measurement.

In some examples, the sim circuitry (e.g., the eSim circuitry such as the sim circuitry 240, 250, and/or 260) may determine the signal factor(s) correspond to a value at or within a range that may indicate the quality of the signal. For example, the sim circuitry may determine the signal factor (e.g., the SSRSRP) corresponds to a value at or within the range of −80 to −65 dB that may indicate the quality of the signal is GOOD. Alternatively or additionally, the sim circuitry may determine the signal factor (e.g., the SSRSRP) may correspond to a value at or within the range of −65 to −45 dB that may indicate the quality of the signal is GREAT. The sim circuitry may determine, for example, the signal factor (e.g., the SSRSRQ) may correspond to a value at or within the range of 0 to 6 dB that may indicate the quality of the signal is GOOD. In some examples, the sim circuitry may determine the signal factor (e.g., the SSRSRQ) may correspond to a value at or within the range of 6 to 20 dB that may indicate the quality of the signal is GREAT. In some examples, the signal factor (e.g., the SSSINR) may correspond to a value at or within the range of 15 to 30 dB that may indicate the quality of the signal is GOOD. In some examples, the signal factor (e.g., the SSSINR) may correspond to a value at or within the range of 30 to 40 dB that may indicate the quality of the signal is GREAT.

In some embodiments, the sim circuitry may generate one or more network scores in response to the one or more signal factors determined. As used herein, the term "network score" refers to a score indicative of the strength and/or quality of a telecom network (e.g., telecommunication network). The network score may be derived from one or more band scores, SSRSRP scores, SSRSRQ scores, SSINR scores, or any other suitable score. The network score may be generated to indicate the strength and/or quality of the first telecom network 110 and/or the secondary telecom network 210.

The sim circuitry (e.g., the eSim circuitry) may assign a band score, SSRSRQ score, SSINR score, and/or SSRSRP score that may include weight(s) and/or point(s) assigned to the determined signal factor(s) to generate the network score(s). For example, the sim circuitry may assign a SSRSRP score of 3 points to the signal factor (e.g., the SSRSRP) that corresponds to a value at or within the range of −80 to −65 dB. Alternatively or additionally, the sim circuitry may assign a SSRSRP score of 5 points to the signal factor (e.g., the SSRSRP) that corresponds to a value at or within the range of −65 to −45 dB. The sim circuitry may assign a SSRSRQ score of 3 points to the signal factor (e.g., the SSRSRQ) that corresponds to a value at or within the range of 0 to 6 dB. In some examples, the sim circuitry may assign a SSRSRQ score of 5 points to the signal factor (e.g., the SSRSRQ) that corresponds to a value at or within the range of 6 to 20 dB. In some examples, the sim circuitry may assign a SSINR score of 3 points to the signal factor (e.g., the SSSINR) that corresponds to a value at or within the range of 15 to 30 dB. The sim circuitry may assign a SSINR score of 5 points to the signal factor (e.g., the SSINR) that corresponds to a value at or within the range of 30 to 40 dB.

The one or more network scores may correspond to one or more frequency bands. A frequency is the number of times per second that a radio wave completes a cycle. As used herein the term "frequency band" may be used to refer to a frequency range that includes a base frequency and an upper frequency within which the user device 130, 140, and/or 150 may connect to the network environment 200 or a portion thereof. The frequency range may be measured by the wavelength in the range. In this regard, the sim circuitry may determine or otherwise check the frequency band (e.g., a 5G frequency band) that the user device is connected to. In turn, the sim circuitry may assign a band score to the connected frequency band. For example, the sim circuitry may determine the user device (e.g., the user devices 130, 140, and 150) is connected to the frequency band (e.g., the high-band 5G) that has a frequency range of 25-39 GHz. In such examples, the sim circuitry (e.g., the eSim circuitry) may determine the frequency band is "Great" and may assign a band score of 5 points to the frequency band. The sim circuitry may determine the user device is connected to the frequency band (e.g., the mid-band 5G) that has a frequency range of 2.5-3.7 GHz. In such examples, the sim circuitry may determine the frequency band is "Good" and may assign a band score of 4 points to the frequency band. In some examples, the sim circuitry may determine the user device is connected to the frequency band (e.g., the lowband 5G) that has a frequency range of 650-800 MHz. In such examples, the sim circuitry may determine the frequency band is "Decent" and may assign a band score of 2 points to the frequency band.

In some embodiments, the network score(s) may be generated in real-time or near real-time. Alternatively or additionally, the network score(s) may be generated over a predetermined time period and/or over a dynamic time period. For example, the one or more network score(s) may be generated over a predetermined time period (e.g., over a predetermined period of seconds, minutes, hours, days, weeks, months, etc.) and/or over a dynamic time period (e.g., a dynamic period of time received by the sim circuitry of the user device).

The one or more network scores may be generated according to an algorithm of 10×(Band score)+5×(SSRSRQ score)+3×(SSINR score)+2×(SSRSRP score)/100. For example, if the user device is connected to a frequency band (e.g., a high-band) of 25 GHz with a −70 dB SSRSRP, SSRSRQ of 16 dB, and SSINR of 28 dB, the sim circuitry may generate a network score of 10×5+5×3+3×5+2×4=88/100. In other examples, if the user device is connected to a frequency band (e.g., a low-band) of 700 MHz with a −70 dB SSRSRP, SSRSRQ of 16 dB and SSINR of 28 dB, the sim circuitry may generate a network score of 10×2+5×3+3×5+2×4=58/100. The sim circuitry may provide the network score(s) to one or more circuits, systems, components, devices, etc. included within or otherwise communicatively coupled to the user device.

In some embodiments, the sim circuitry (e.g., the eSim circuitry such as the sim circuitry 240, 250, and/or 260) may provide at least one electronic indication of network benefit of the first telecom network associated with the first carrier. In some embodiments, the sim circuitry may provide at least one electronic indication of network benefit of the secondary telecom network associated with the secondary carrier. In some embodiments, the sim circuitry may provide at least one electronic indication of network benefit of the first telecom network associated with the first carrier and the secondary telecom network associated with the secondary carrier. The term "electronic indication of network benefit" may be used herein to refer to an output provided by the sim circuitry and/or the user device. The electronic indication of network benefit may include network score(s), visual indicator(s) (e.g., text, color, image, video, etc.), audio indicator(s), etc. that may be output by the sim circuitry via the user device (e.g., a mobile device, wearable, wireless device, etc.), mobile application, user interface, touch screen, display, speaker, and/or any other suitable output device, system, and/or component. In some embodiments, the electronic indication of network benefit may be provided in real-time or near real-time.

Continuing with the example above, the network score of 58/100 may be provided by the sim circuitry as at least one electronic indication of network benefit of the first telecom network (e.g., a provider network or primary telecom network the user device connects to that is used by the end user such as the first telecom network 110) associated with the first carrier. Alternatively or additionally, the text "Moderate" may be provided by the sim circuitry as the at least one electronic indication of network benefit for the network score of 58/100. In other examples, the network score of 88/100 may be provided by the sim circuitry as the at least one electronic indication of network benefit of the secondary telecom network (e.g., a telecom network of interest to an end user such as the secondary telecom network 210) associated with the secondary carrier. In further examples, the text "Great" may be provided by the sim circuitry as the at least one electronic indication of network benefit. In some examples, other electronic indications of network strength (e.g., visual indicators such as, but not limited to, the text "Good", "Poor", etc.) may be provided by the sim circuitry. Accordingly, in the current examples, the electronic indications of network strength (e.g., the network score of "88/100," the network score of "58/100," the text "Great," and/or the text "Moderate") may be provided (e.g., output or otherwise visually provided) by the sim circuitry via the user device, mobile application, user interface, touch screen, display, speaker, and/or any other suitable output component.

Advantageously, the sim circuitry provides the network benefits of the secondary telecom network in addition to or alternative to the first telecommunication network. A user (e.g., a potential subscriber to the secondary network) of the user device can compare the electronic indication of network benefit of the respective telecom network(s) associated with the first carrier and/or secondary carrier to make an informed decision as to the strength and/or quality of each telecom network.

Figure 3:
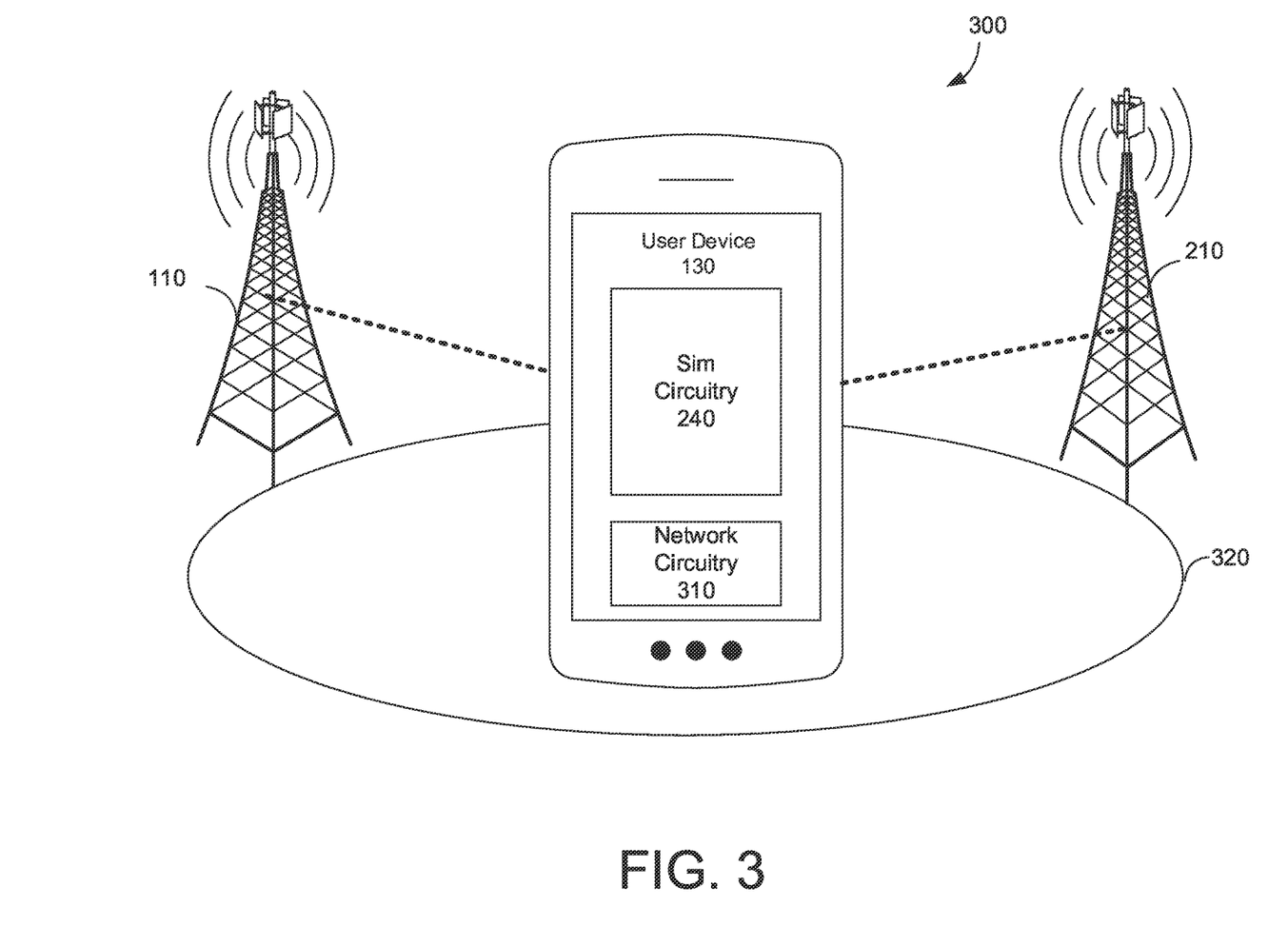
FIG. 3 is a diagram of a network environment including a plurality of telecom networks and sim circuitry in accordance with an example embodiment.

FIG. 3 is a diagram of the network environment 300 (e.g., a telecommunication environment such as, but not limited to, a wireless telecommunication environment) according to an example embodiment. In the present embodiment, the network environment 300 includes the telecom networks 110 and 210, user device 130, sim circuitry 240, network circuitry 310, and the geographic area 320.

In some examples, the sim circuitry 240 may monitor the first telecom network 110 associated with a first carrier and/or the secondary telecom network 210 associated with a secondary carrier. The sim circuitry 240 may simultaneously monitor a device signal (e.g., radio signal) such that the sim circuitry 240 may simultaneously monitor at least one first device signal associated with the first telecom network 110 and at least one secondary device signal associated with the secondary telecom network 210. In some examples, the first telecom network 110 (e.g., a provider network) and the secondary telecom network 210 (e.g., (e.g., a telecom network of interest to an end user) may be simultaneously read by the sim circuitry 240 (e.g., a SIM card) and/or the sim circuitry 240 (e.g., the eSim circuitry). The sim circuitry 240 may monitor such telecom network(s) to retrieve, read, or otherwise receive network information corresponding to one or more device signals from the network circuitry 310, the first telecom network, and/or the secondary telecom network.

The sim circuitry 240 may receive at least one first device signal associated with the first telecom network 110 and at least one secondary device signal associated with the secondary telecom network 210. In some embodiments, the sim circuitry 240 may receive the first device signal(s) and/or the secondary device signal(s) associated with one or more geographic areas (e.g., the geographic area 320). The geographic area may include at least one previous device area associated with the user device 130. For example, a previous device area may include a geographic area that includes a cell site the user device 130 is connected to frequently such as, but not limited to, the cell site the user device 130 connects to or interacts with while a user is home, at work, shopping, or any other frequently visited area. In some examples, the geographic area may include an indication of a geographic interest area. An indication of the geographic interest area may include an area identified by the user that is received by the user device 130. The indication of the geographic interest area may be received by the sim circuitry 240 in response to receipt of text input, audio input, and/or a click of a link, icon, button, display, graphical user interface, map, etc. Advantageously, when the sim circuitry 240 receives device signal(s) associated with one or more geographic areas, the user (e.g., the potential subscriber) may compare the cell quality and signal strength of each respective telecom network at such geographic area(s).

The sim circuitry 240 may switch between the first telecom network 110 and the secondary telecom network 210. In some embodiments, the sim circuitry 240 may switch between the telecom networks automatically. Alternatively or additionally, the sim circuitry 240 may take a snapshot of a telecom network (e.g., the telecom network 110 and/or 210) responsive to the switch between the telecom networks. The snapshot may include one or more graphical user interfaces, and/or one or more geographic areas (e.g., at home, work, and/or shopping location(s) associated with the user device) such that the SSRSRP, SSRSRQ, SSINR, RSRP, RSRQ, RSSI, RSSNR, and/or any other suitable signal measurement at, or within, the geographic area(s) may be compared.

Figure 4:
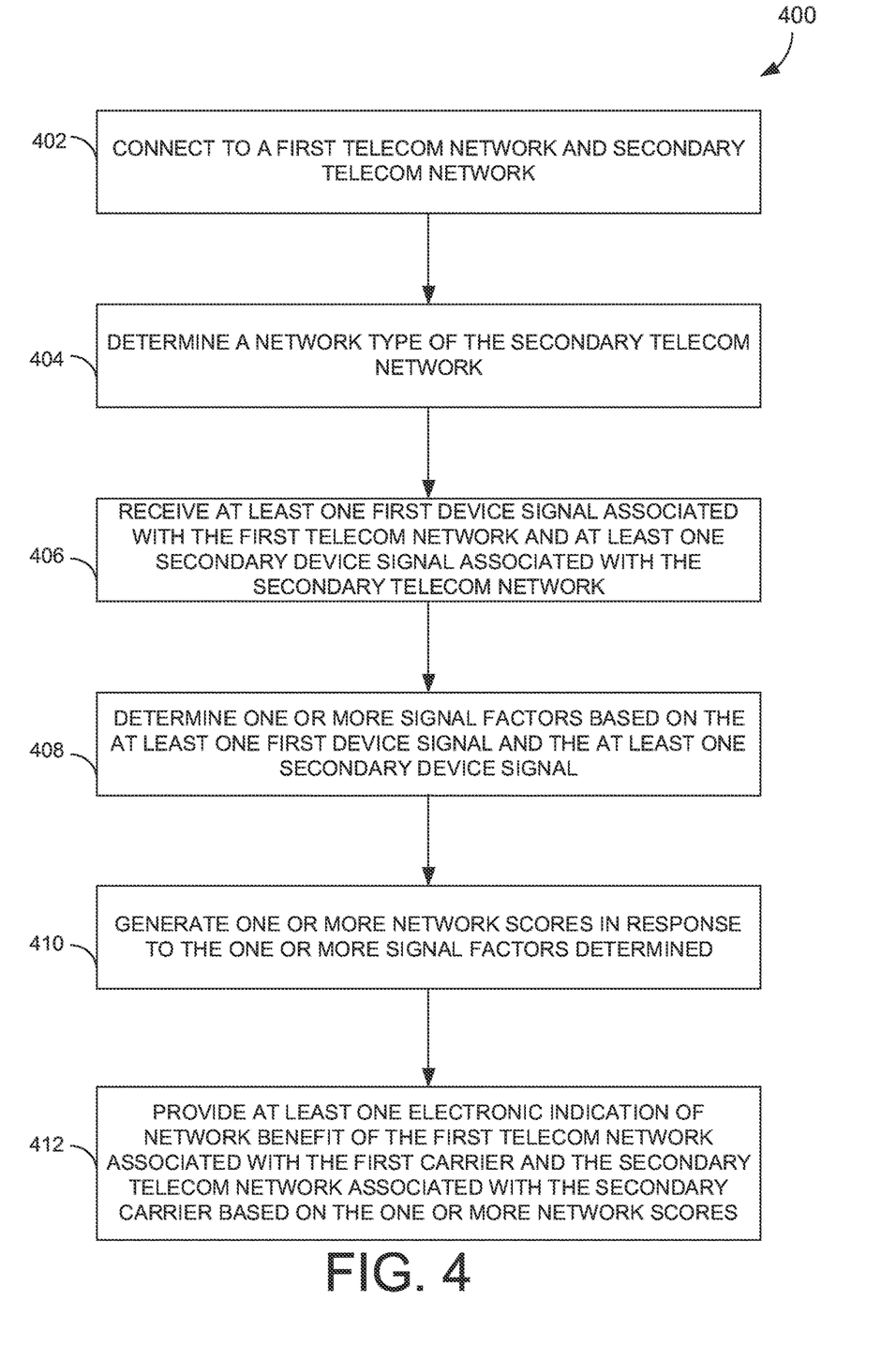
FIG. 4 depicts a flowchart of an exemplary method for providing at least one electronic indication of network benefit of a telecommunication network in accordance with an example embodiment.

FIG. 4 depicts a flow diagram of an exemplary method 400 for providing at least one electronic indication of network benefit of a telecommunication network, in accordance with implementations of the present disclosure. Initially at block 402 the user device is connected to or otherwise registered to a first telecom network associated with a first carrier and/or a secondary telecom network associated with a secondary carrier. The user device may be communicatively coupled to sim circuitry (e.g., eSim circuitry). In some embodiments, the user device may include the sim circuitry.

At block 404, the network type of the first telecom network, the secondary telecom network, or any other suitable network is determined by the sim circuitry. The sim circuitry may determine the network type of the secondary telecom network is a 4G, LTE, or 5G network. At least one first device signal associated with the first telecom network and/or at least one secondary device signal associated with the secondary telecom network is received at block 406. The device signal received may include or otherwise take the form of a radio signal.

At block 408, one or more signal factors are determined based on the first device signal, the secondary device signal, and/or any other suitable device signal by the sim circuitry. Accordingly, the sim circuitry may determine one or more signal factors (e.g., the SSRSRP, SSRSRQ, SSINR, RSRP, RSRQ, RSSI, RSSNR, and/or any other suitable signal measurement) that may be indicative of signal strength reporting criteria, signal strength threshold(s), signal level function(s), signal measurement type(s), etc. derived from a signal. In some examples, the sim circuitry may determine the signal factor corresponds to a value at or within a range that may indicate the quality of the signal.

At block 410, one or more network scores are generated in response to the one or more signal factors determined. In this regard, the network score may indicate the strength and/or quality of a telecom network. In some examples, the network score may be generated from one or more band scores, SSRSRP scores, SSRSRQ scores, and/or SSINR scores. The sim circuitry may assign a band score, SSRSRQ score, SSINR score, and/or SSRSRP score to the determined signal factor(s) to generate the network score(s). The sim circuitry may determine or otherwise check the frequency band (e.g., a 5G frequency band) that the user device is connected to. In turn, the sim circuitry may assign a band score to the connected frequency band. The one or more network scores may be generated according to an algorithm of 10×(Band score)+5×(SSRSRQ score)+3×(SSINR score)+ 2×(SSRSRP score)/100.

At least one electronic indication of network benefit (e.g., the network score(s), visual indicator(s) (e.g., text), audio indicator(s), etc.) of the first telecom network associated with the first carrier and/or the secondary telecom network associated with the secondary carrier are provided by the sim circuitry based on the one or more network scores at 412. Such electronic indication(s) of network strength may be output by the sim circuitry via the user device (e.g., a mobile device, wearable, wireless device, etc.), mobile application, user interface, and/or any other suitable output device, system, and/or component.

Figure 5:
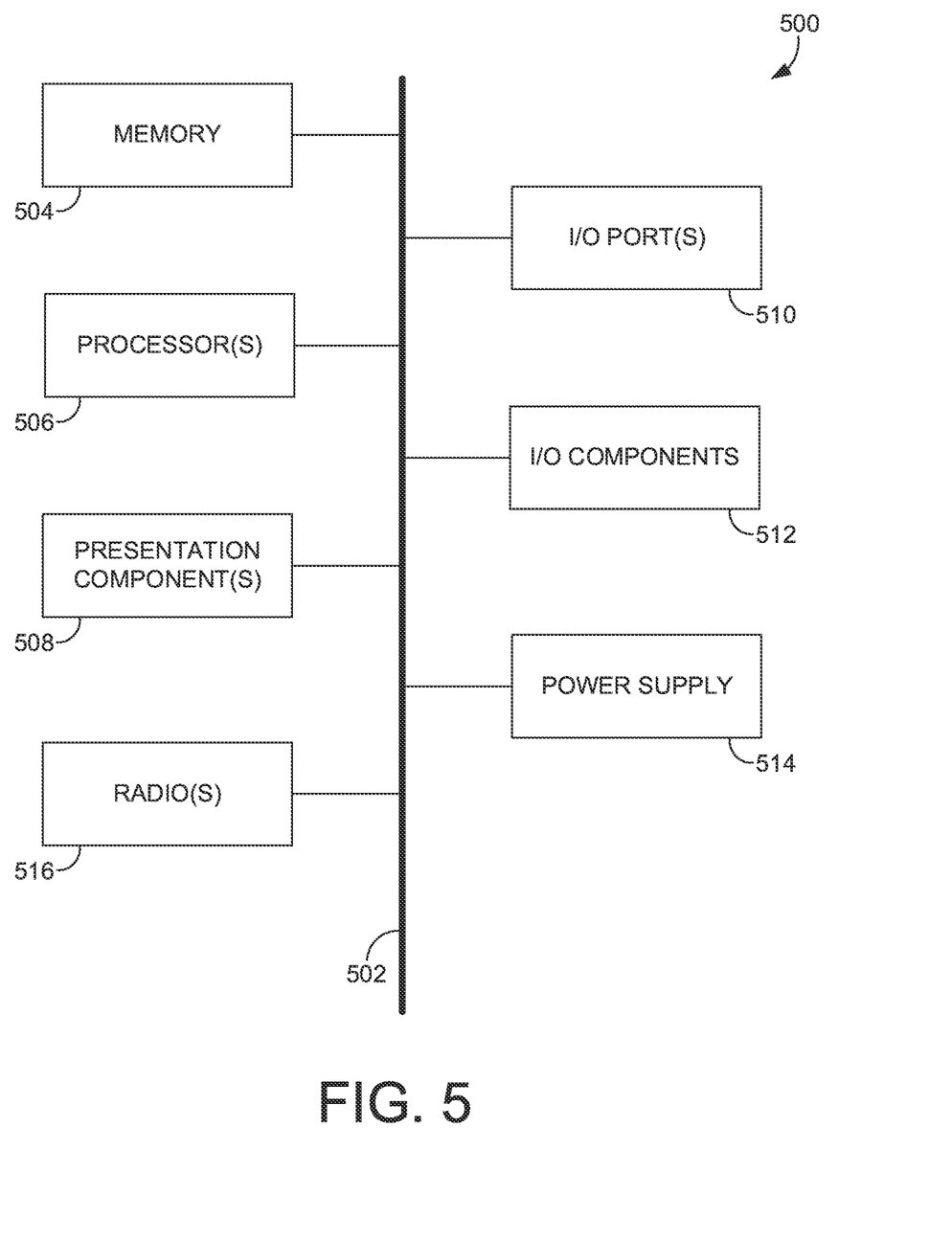
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunication network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 may be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method for providing at least one electronic indication of network benefit of a telecommunication network, the method comprising:
   connecting, by a user device communicatively coupled to sim circuitry, to a first telecom network corresponding to a first carrier and a secondary telecom network corresponding to a secondary carrier;
   determining, by the sim circuitry, a network type of the secondary telecom network;
   receiving, by the sim circuitry, at least one first device signal assigned to the first telecom network and at least one secondary device signal assigned to the secondary telecom network;
   determining, by the sim circuitry, one or more signal factors based on the at least one first device signal and the at least one secondary device signal;
   generating, by the sim circuitry, one or more network scores in response to the one or more signal factors determined; and
   based on the one or more network scores, providing, by the user device communicatively coupled to the sim circuitry, at least one electronic indication of network benefit of the first telecom network corresponding to the first carrier and the secondary telecom network corresponding to the secondary carrier.

2. The method of claim 1, wherein the user device comprises the sim circuitry, and wherein the sim circuitry comprises eSim circuitry.

3. The method of claim 1, wherein the one or more network scores correspond to one or more frequency bands, and wherein the one or more signal factors comprise a measure of at least one of a secondary synchronization signal reference signal received power (SSRSRP), secondary synchronization signal reference signal received quality (SSRSRQ), or signal-to-noise and interference ratio (SS-INR).

4. The method of claim 1, wherein the user device is structured to receive the at least one first device signal and the at least one secondary device signal in a geographic area.

5. The method of claim 4, wherein the geographic area comprises at least one of a previous device area corresponding to the user device or an indication of a geographic interest area.

6. The method of claim 1, wherein the sim circuitry is structured to switch between the first telecom network and the secondary telecom network.

7. The method of claim 1, wherein the sim circuitry is structured to simultaneously monitor the at least one first device signal assigned to the first telecom network and the at least one secondary device signal assigned to the secondary telecom network.

8. The method of claim 7, wherein the first and secondary telecom networks comprise one or more cell sites, and wherein the electronic indication of network benefit comprises at least one of a network score, visual indicator, or audio indicator.

9. The method of claim 8, wherein the one or more cell sites are operable based on at least one of a 4G network, E-UTRAN New Radio-Dual Connectivity (EN-DC) network, or 5G network.

10. A non-statutory computer-readable storage media having computer-executable instructions embodied thereon that, when executed by one or more processors, cause the one or more processors to:
monitor a first telecom network corresponding to a first carrier and a secondary telecom network corresponding to a secondary carrier;
receive at least one first device signal assigned to the first telecom network and at least one secondary device signal assigned to the secondary telecom network, the at least one first device signal and the at least one secondary device signal assigned to one or more geographic areas;
determine one or more signal factors based on the at least one first device signal and the at least one secondary device signal assigned to the one or more geographic areas;
generate one or more network scores in response to the one or more signal factors determined; and
based on the one or more network scores, provide in real-time at least one electronic indication of network benefit of the first telecom network corresponding to the first carrier and the secondary telecom network corresponding to the secondary carrier.

11. The non-transitory computer-readable storage media of claim 10, wherein the user device comprises the sim circuitry, and wherein the sim circuitry comprises eSim circuitry.

12. The non-transitory computer-readable storage media of claim 10, wherein the one or more network scores correspond to one or more frequency bands, and wherein the one or more signal factors comprise a measure of at least one of a secondary synchronization signal reference signal received power (SSRSRP), secondary synchronization signal reference signal received quality (SSRSRQ), or signal-to-noise and interference ratio (SSINR).

13. The non-transitory computer-readable storage media of claim 10, wherein the user device is structured to receive the at least one first device signal and the at least one secondary device signal in the one or more geographic areas.

14. The non-transitory computer-readable storage media of claim 13, wherein the geographic area comprises at least one of a previous device area corresponding to the user device or an indication of a geographic interest area.

15. The non-transitory computer-readable storage media of claim 10, wherein at least one of the first telecom network or the second telecom network is operable based on at least one of a 4G network, E-UTRAN New Radio-Dual Connectivity (EN-DC) network, or 5G network.

16. A system for providing at least one electronic indication of network benefit of a telecommunication network, the system comprising:
a first telecom network associated with a first carrier; and
a user device comprising sim circuitry, the user device structured to:
connect to the first telecom network and a secondary telecom network;
determine a network type of the secondary telecom network;
receive at least one first device signal assigned to the first telecom network and at least one secondary device signal assigned to the secondary telecom network;
determine one or more signal factors based on the at least one first device signal and the at least one secondary device signal;
generate one or more network scores in response to the one or more signal factors determined; and
based on the one or more network scores, provide at least one electronic indication of network benefit of the first telecom network corresponding to the first carrier and the secondary telecom network corresponding to the secondary carrier.

17. The system of claim 16, wherein the user device comprises the sim circuitry, and wherein the sim circuitry comprises eSim circuitry.

18. The system of claim 16, wherein the one or more network scores correspond to one or more frequency bands, and wherein the one or more signal factors comprise a measure of at least one of a secondary synchronization signal reference signal received power (SSRSRP), secondary synchronization signal reference signal received quality (SSRSRQ), or signal-to-noise and interference ratio (SSINR).

19. The system of claim 16, wherein the electronic indication of network benefit comprises at least one of a network score, visual indicator, or audio indicator.

20. The system of claim 16, wherein the one or more network scores are generated in real-time or near real-time.

* * * * *